United States Patent Office 2,917,384
Patented Dec. 15, 1959

2,917,384

METHOD OF MAKING FOAM MATERIAL FROM NICKEL POWDER

Max Ferdinand Grandey, Hamilton, Ohio, assignor to General Electric Company, a corporation of New York No Drawing. Application January 19, 1956
Serial No. 560,058

2 Claims. (Cl. 75—222)

This invention relates to metallic foam materials and a method of producing same and, more particularly, to a metallic foam material for elevated temperature applications.

Cellular bodies, sometimes called foam materials have been found useful as thermal insulators, high frequency sound attenuation media, filters and control barriers for gases, vapors, and liquids, oil retaining bearing materials, or in applications where lightweight is a consideration.

Gas turbine engines and similar power units generally comprise a compressor, combustion section and turbine in series flow relation. Air entering the compressor section is compressed in order to obtain rapid and efficient combustion of fuel in the combustion section of the engine. One of the problems in present rotating compressor design is to prevent air leakage in order to obtain optimum compressor efficiency and reduce energy losses to a minimum in the compressor section. Therefore, air seals are incorporated into the compressor section to minimize air leakage where the rotating compressor parts come into close proximity with stationary parts. It is also desirable to reduce leakage from stage to stage in a multi-stage compressor by suitable seal means.

The same problem is present in the expansion or turbine section of the engine. One difference that exists between the turbine and compressor sections is that the temperatures and velocities of flow are higher and the pressures are lower in the turbine section.

There are numerous locations throughout gas and steam turbines or similar power plants wherein it is desired that a gas or vapor be retained or be passed through a controlling barrier. Frequently, labyrinth type seals are used in such power plants to control transfer or leakage of air from high to low pressure areas by causing pressure drops to take place across each step of the labyrinth. Each stage of the labyrinth acts in a manner similar to an orifice allowing the gas to expand as it passes through. As a result, by the time the high pressure air on one side of the seal has passed through the seal, its pressure has been greatly reduced. Leakage thereby is minimized. Unfortunately, this type of seal is not as efficient as is desired and is easily damaged in manufacture, production and operation. The product of this invention contemplates a material that may be used as a more efficient seal material for applications of this type.

Porous bodies, of which foam materials are an example, have been prepared in a number of ways for elevated temperature use. Non-metallic porous bodies have been prepared by intermixing a refractory filler with a substance which will volatilize or sublime at elevated temperatures. When pressed into a shape and fired, the body becomes porous due to the escape of the volatilized substance. Metallic porous bodies may be produced in a similar manner: a metallic powder or metallic oxide is mixed with a material which will be driven off at elevated temperatures. After pressing this mixture into shape, the metal powder is sintered at elevated temperatures. This volatilizes the intermixed materials causing voids or pores to form. Fluxes sometimes are used to aid in the fusion of the tiny metallic particles. In any case, the porosity results from the driving off of a substance to leave a void, be the process a reduction of an oxide to the native metal, a reduction of an organic or silacious material to a refractory product and a void, or the complete evacuation or volatilization of an organic substance resulting in a void.

Porous bodies are sometimes prepared by melting out or dissolving out undesirable components from alloys. However, the purity of the final product and its porosity leaves much to be desired.

Metallic bodies of a porous nature may be produced by still another method which uses a metal oxide or a metal which can be oxidized and then reduced. This metal or metal oxide first is mixed with a foam in the uncured or wet state. After drying this foam, it is sintered and the metal oxide which is intermixed with the foam is reduced wholly or partially to give a metallic or partially metallic nonmetallic porous body. The reduction of the oxide in this process tends to give the article its strength and helps bind it together.

In all of these aforementioned methods, the pore size depends wholly or partially on the amount of extraneous material driven off or on the amount of oxide reduced. For example, the last method above where the foam is used in conjunction with a metal oxide to form the porous body, either the pore size is very small resulting in only a slight decrease in density, or the strength and ductility properties are very poor. These characteristics are brought about principally by the necessarily large volume decrease which occurs in reducing the metal oxide to the native metal. Either a contraction in the pore results or a breaking of the pore wall occurs, thereby weakening the whole body.

One of the objects of this invention is to obviate the above mentioned difficulties.

Another object is to provide a foam material which at room temperature as well as at elevated temperatures is strong and rigid yet ductile, light in weight, resistant to oxidation, thermal shock and deformation, maintaining low heat conductivity and the ability to control the flow of gases, vapors or liquids through interconnected pores which is useful in one application as a seal material.

Another object is to provide a method for producing a metallic foam which has pore sizes dependent mainly on a foamable material which is subsequently eliminated in the process and not upon the character of a powder which is subsequently reduced.

These and other objects, advantages and features of the invention will become apparent from the following description which is merely explanatory.

Briefly, my invention involves the mixing of a metallic powder with a resinous material and possibly a foaming agent, causing a foam to be produced from this combination then heat treating the product to remove the resinous material and foaming agent to thereby form a foamed metallic product.

In the process of this invention, the three basic materials that may be used are: (1) a clean, unoxidized, fine metallic powder which should be one that can be maintained in a reduced state in an inert or reducing atmosphere or in a vacuum; for example, nickel, chromium, cobalt, iron, titanium, stainless steels, nichrome, aluminum, magnesium and combinations or alloys thereof (2) a foamable resinous material such as a silicone, phenolic, isocyanate, alkyd or polyester and, where conditions show it to be desirable, (3) a foaming agent; a material sometimes called a blowing agent which causes a foamable resin to form a foamed body by liberating a gas into the resin. This gas liberation is brought about through the use of heat or catalytic materials.

Before intermixing these basic parts, the fine metallic powder should be cleaned and should be reduced by chemical means or by heating in a reducing atmosphere to remove all oxides. This preliminary step is not mandatory but it helps to assure better results in later processing. In addition, the oxides of some metals such as titanium and aluminum will not be reduced in atmospheres such as hydrogen; hence, since this process is best carried on without the presence of oxides, it is desirous that pure metal powder be used from the start.

The clean, unoxidized metal is mixed with a foamable resin and, where conditions show it to be desirable, a foaming agent. Examples of foaming agents are chemicals such as nitrates, hydrides, peroxides, or standard bridged cyanidine compounds. Many resins require something besides heat to cause a reaction to occur. In such cases another substance which changes the rate of reaction is required. This substance is called a foaming agent or catalyst. The mixture is catalyzed to bring about a gas liberation from the foaming agent and the consequential formation of a foam product comprised of a metal-resin network. The degree of catalyzing action or heat required to bring about formation of a foam depends on the type of resin employed.

The resulting foamed body is heated in an inert or reducing atmosphere or in a vacuum at a temperature sufficient to drive off or reduce all organic matter remaining from the foamable resin or foaming agent. This step is followed by a heat treatment in an inert or reducing atmosphere or in a vacuum at a temperature sufficient to fuse the cell walls of the foamed metal network to produce a strong, rigid mass containing interconnected voids or pores throughout. By varying the type of foamable resin, type and size of metal powder, type of foaming agent and temperature along with a variation in the flow of the surrounding atmosphere, a foam containing nearly any range of pore sizes and physical properties may be obtained.

My invention will be better understood from the following description, incorporated in the succeeding examples, which are given by way of illustration only and not in any sense by way of limitation. Its scope will be pointed out in the appended claims.

*Example I*

99% pure nickel powder of 95% minus 325 mesh size is placed in a hydrogen atmosphere furnace and heated for about an hour in order to reduce any nickel oxide to nickel and to drive off all foreign organic material. The hydrogen is circulated through the powder and the temperature held below 1400° F. to avoid caking of the powder. This clean, unoxidized metallic powder is mixed with a 100% solids foamable silicone resin of the methyl phenyl silane type and with a commercial bridged cyanidine foaming agent, an example of which is:

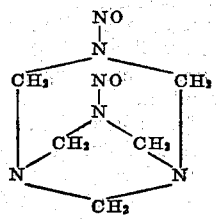

The following proportions by weight are used:
422 parts of nickel powder
110 parts of silicone resin
5 parts of foaming agent The intimately mixed powders are then placed in a rectangular confining mold and heated at 400° F. for one hour to polymerize the resin and to decompose the foaming agent to bring about the formation of a foamed resin-metal body. The foam is removed from the mold and placed in a retort at 800° F. containing a hydrogen atmosphere of −100° F. dewpoint and a flow rate of 50 cubic feet per hour. The temperature in the retort is slowly increased to 1200° F. over a period of about three hours and held at 1200° F. for one and one-half to two hours to burn off and remove all organic matter including all resin and all foaming agent. The end of the burning off period is indicated by an absence of all yellow color in the flame of the hydrogen being burned off at a retort exit. When this point is reached, the retort temperature is slowly increased to 2125° F. and held there for about three hours to bring about fusion of the metal in the cell walls of the foam. A time-temperature relationship exists for this fusion step with as low as 1800° F. taking considerably longer and 2400° F. taking slightly less time to bring about proper fusion. After the fusion period is over, the temperature is allowed to fall to 750° F. before the foamed article is removed from the hydrogen atmosphere retort.

The density of the final product is a function of the volume into which the foam is allowed to expand. If the aforementioned parts are in grams and the confining mold is 51.75 cubic inches in volume, the resulting metallic nickel foam has a density of 75 to 80 pounds per cubic foot. It is rigid yet ductile and is composed of about 90% voids by volume, principally interconnected.

The succeeding examples are given to indicate variations in compositions, densities, etc. The method employed is the same as that given in Example I unless otherwise specified.

*Example II*

A more dense and stronger foam may be produced from the following proportions by weight in grams and using a confining mold of 51.75 cubic inches in volume:

844 parts of nickel powder
210 parts of silicone resin
10 parts of foaming agent The density of this material is 155 pounds per cubic foot which is about twice that of the material shown in Example I. The voids comprise about 75% of the volume and are principally interconnected.

*Example III*

Another variation of composition may be formed from the following mixture by weight in grams using a mold of 51.75 cubic inches volume:

1266 parts of nickel powder
315 parts of silicone resin
15 parts of foaming agent This material is stronger than that produced in Examples I and II above. Comprised of 60% voids principally interconnected, it has a density of about 204 pounds per cubic foot when formed in a confining mold of 51.75 cubic inches in volume.

*Example IV*

Using commercial Nichrome powder of minus 325 mesh size, the following mixture by weight in grams will give a foamed article if fused at 2175° F. for three hours where the size of the mold is 51.75 cubic inches in volume:

422 parts of Nichrome powder
105 parts of silicone resin
5 parts of foaming agent

*Example V*

A.I.S.I. type 302 stainless steel powder has been used successfully in producing foamed articles by employing a fusion cycle of 2175° F. for three hours and the following mixture by weight in grams with a confining mold having a volume of 51.75 cubic inches:

422 parts of stainless steel powder
105 parts of silicone resin
5 parts of foaming agent The mesh size of the powder used is as follows:

| Through Screen | Retained on Screen | Percent |
|---|---|---|
|  | 100 | 3 |
| 100 | 150 | 21 |
| 150 | 200 | 25 |
| 200 | 250 | 15 |
| 250 | 325 | 13 |
| 325 |  | 23 |

*Example VI*

99% pure iron powder was used in the following mixture with success when fused at 2175° F. for three hours. The portions are in grams by weight and the mold cavity had a volume of 51.75 cubic inches.

422 parts cast iron powder
110 parts of silicone resin
4 parts foaming agent

The mesh size of the powder used is as follows:

| Through Screen | Retained on Screen | Percent |
|---|---|---|
|  | 100 | Trace |
| 100 | 150 | 6 |
| 150 | 200 | 13 |
| 200 | 250 | 17 |
| 250 | 325 | 28 |
| 325 |  | 36 |

*Example VII*

Using 99% pure nickel of 95% minus 325 mesh size, the following mixtures produced useful foams. The fusing cycles were 2175° F. for three hours in a mold of 51.75 cubic inches. The mixtures are by weight in grams:

422 parts nickel powder
110 parts diisocyante resin
5 parts foaming agent
422 parts nickel powder
110 parts phenolic resin
5 parts foaming agent
422 parts nickel powder
110 parts alkyd resin
5 parts foaming agent The pore size of these foamed articles may be varied by varying the amount of foaming agent added and the volume of the confining mold. The density of the articles formed are roughly a direct proportion to the amount of materials added when holding mold size constant; that is, doubling the weight of the proportionate parts of the mixture of metal, resin and foaming agent will give an article of approximately twice the density.

In some applications such as for fluid or air seals, it is desirous that the pores of a face of the foam be blocked. This blocking may be accomplished by causing a movable abrasive surface such as a grinding wheel or sanding belt to rub on that face. A smearing of the foams will occur forming an impervious, continuous sheet of metal intimately attached to the rest of the foamed body without uncovering new pores. Therefore, in a rubbing seal application, this material exhibits the property of supplying a continuously formed barrier to the flow of liquids, vapors or gases. The foam's properties are a function of the type of the powdered metal used, the foam's pore size and its density. By adjusting the foam's properties, various machining characteristics can be evolved.

Although the present invention has been described in conjunction with specific examples, these are to be construed as illustrations rather than limitations on the processes which are capable of modifications and variation as those skilled in the art will readily understand.

What I claim as new and desire to secure by Letters Patent of the United States is:

1. The method for making foam material comprising the steps of mixing 99% pure nickel powder of 95% minus 325 mesh size with a 100% solids methyl phenyl silane resin, heating the resulting mixture to 400° F. for from one to two hours to cause foaming, placing the material in a hydrogen atmosphere retort at 800° F. and heating slowly over a period of from two to five hours to 1200° F., holding at 1200° F. for from one and one-half to two hours, increasing the retort temperature slowly to between 1800 and 2400° F. and holding at the latter temperature between one and eight hours.

2. The method of claim 1 wherein a bridged cyanidine compound is added to increase the rate of foaming.

References Cited in the file of this patent
UNITED STATES PATENTS

| 1,919,730 | Koenig et al. | July 25, 1933 |

FOREIGN PATENTS

| 616,839 | Great Britain | Jan. 27, 1949 |
| 706,476 | Great Britain | Mar. 31, 1954 |
| 714,560 | Great Britain | Sept. 1, 1954 |